WILSON & THOMAS.
Burglar Alarm.
No. 964. Reissued May 22, 1860.
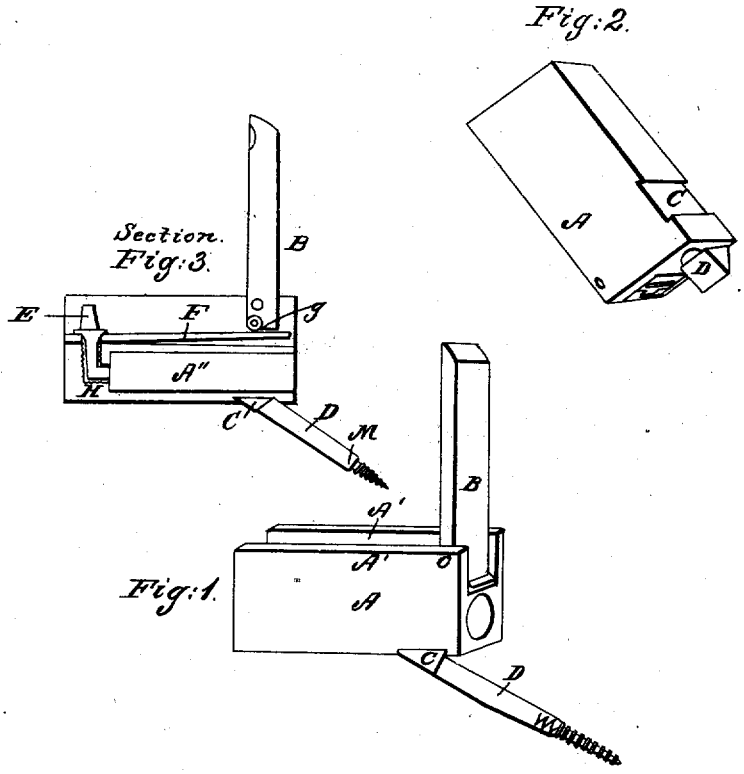
Witnesses:
J. E. S. Hamilton
W. H. Thomas
Inventors:
John P. Wilson
John F. Thomas.
N. PETERS, Photo-Lithographer, Washington, D. C.

UNITED STATES PATENT OFFICE.

THE WILSON MANUFACTURING COMPANY, OF FRANKFORT, ASSIGNEES OF JOHN P. WILSON AND JOHN F. THOMAS, OF ILION, NEW YORK.

IMPROVEMENT IN BURGLAR-ALARMS.

Specification forming part of Letters Patent No. 22,911, dated February 8, 1859; Reissue No. 964, dated May 22, 1860.

*To all whom it may concern:*

Be it known that JOHN P. WILSON and JOHN F. THOMAS, of Ilion, in the county of Herkimer and State of New York, did invent certain new and useful Improvements in Burglar-Alarms; and I do hereby declare that the following is a full, clear, and exact description of the same, reference being had to the accompanying drawings, and to the letters of reference marked thereon.

The nature of this invention consists in the arrangement and construction of the several parts, which will be herein particularly described.

In order that those skilled in the art may make and use this invention, I will proceed to describe its construction and operation.

In the drawings, A represents the body of the alarm, which consists of a rectangular piece of metal in the form shown in the figures.

A″ represents a hole which is bored or drilled lengthwise of the body A, from one end almost to the other. In the rear of this bore or hole a screw, H, is cut.

A′ A′ represent two sides of a groove which is cut through the body A lengthwise and from one end to the other. In the bottom of this groove is placed a spring, F, one end of which is confined by means of a tube, E, which passes through it and screws into the body, opening into the rear of the screw in the end of the bore, as will be seen in Fig. 3. The other end of the spring bears up against one end of the hammer B, which is secured by means of a pivot between the two sides A′ A′. When the hammer is raised, its lower end bears the spring down and it stands as seen in Fig. 3; but when the hammer starts to fall the spring gives it impetus and brings it down with force upon the tube.

E C represents a dovetailed slot or groove made crosswise of the body.

D represents a screw with a gimlet at one end, and the other end so formed as to fit snugly in the dovetailed slot C, said screw standing out from the body at a small angle when secured in the slot. When the alarm is not in use, the screw D is removed from the slot C, and being inserted in the barrel, the male screw in the end of the barrel or bore, and thus secures it firmly in said bore.

When the alarm is to be used, the screw D is secured in the slot, as seen in Figs. 1 and 3. The barrel is then loaded with powder and ball, if desired; a cap is placed upon the tube E, the hammer is raised, and the screw D is screwed into the casing of the door in such close proximity to the door that it will strike the hammer when the door opens, and thus throw it down, igniting the cap and setting off the load, which causes a loud report, and thus alarms the inmates of the dwelling. When the hammer falls, it fits snugly between the sides A′ A′, which form a protection for it. The tube E, being incased between the sides and hammer, is completely protected, and the cap is bursted, its fragments cannot fly off and do damage, and being thus covered, a much louder report is produced.

Having thus fully described the invention, I claim—

1. The employment, in connection with the within-described gun or alarm, of an adjustable gimlet-screw, D, which is secured in the dovetailed groove in the body while in use, and which is secured in the barrel or bore by a screw when not in use, substantially as herein specified.

2. The employment of the two sides A′ A′, between which the hammer falls, which serve to prevent particles of the cap from flying off, and at the same time forming a snug protection for the hammer and causing a louder report of the cap, as is herein fully described.

3. Securing the rear of the spring F to the body of the gun by means of the nipple which passes through said spring and screws into the body, substantially as and for the purpose specified.

J. A. REQUA,
*President Wilson Manufacturing Company.*

Witnesses:
ISAAC REQUA,
SAMUEL M. JOHNSON.